United States Patent [19]

Capy

[11] Patent Number: 5,188,265
[45] Date of Patent: Feb. 23, 1993

[54] CONTINUOUS SHEET PLEATING DEVICE FOR MAKING OVERLAPPING PLEATS AND ARRANGEMENTS FOR MAKING AREAS WITH NO PLEATS AND METHOD OF MAKING PLEATS

[75] Inventor: Gilbert Capy, La Botte 69640, Jarnioux, France

[73] Assignees: Gilbert Capy; Akiva Buchberg, both of France

[21] Appl. No.: 687,384

[22] Filed: Apr. 18, 1991

[30] Foreign Application Priority Data

Apr. 30, 1990 [FR] France .................. 90 05747
Jun. 26, 1990 [FR] France .................. 90 08304

[51] Int. Cl.⁵ ............................................ A41H 43/00
[52] U.S. Cl. ....................................... 223/32; 223/28; 28/279; 425/336; 425/369; 425/396
[58] Field of Search .................. 223/32, 28; 28/279, 28/278; 26/1; 425/336, 369, 396

[56] References Cited

U.S. PATENT DOCUMENTS

| | | | |
|---|---|---|---|
| 2,429,482 | 10/1947 | Munters | 154/30 |
| 2,551,808 | 5/1951 | Minns | 223/32 |
| 3,646,646 | 3/1972 | Koizumi et al. | 28/279 X |
| 3,947,206 | 3/1976 | DeLight et al. | 425/388 |
| 3,991,994 | 11/1976 | Farrish | 270/73 |
| 4,153,664 | 5/1979 | Sabee | 264/289 |
| 4,323,021 | 4/1982 | Durand | 223/32 X |
| 4,338,154 | 7/1982 | Bethelot et al. | 425/369 X |
| 4,364,494 | 12/1982 | Shive, Jr. | 223/32 X |
| 4,381,212 | 4/1983 | Roberts | 425/369 X |
| 4,499,040 | 2/1985 | Maemoto et al. | 425/369 X |
| 4,618,394 | 10/1986 | Hoffman | 425/369 X |
| 4,787,954 | 11/1988 | Nikkel | 425/369 X |

FOREIGN PATENT DOCUMENTS

| | | |
|---|---|---|
| 1460606 | 2/1969 | Fed. Rep. of Germany . |
| 482701 | 5/1948 | France . |
| 1571358 | 7/1980 | United Kingdom . |

*Primary Examiner*—Peter Nerbun
*Assistant Examiner*—Bibhu Mohanty
*Attorney, Agent, or Firm*—Kane, Dalsimer, Sullivan, Kurucz, Levy, Eisele and Richard

[57] ABSTRACT

The device includes a toothed wheel on which pleats of a sheet 10 are preformed, in some cases with the aid of a second toothed wheel 31, and a device for holding by a vacuum; then the preformed pleats are transferred to a pleat gathering wheel 13 either directly or through the medium of a pleat pressing wheel, where they are laid down then fixed to form a pleated sheet 23. The toothed wheels 5 and 31 and the pleat pressing wheel and/or the pleat gathering wheel 13 can be arranged to produce areas with no pleats at regular intervals.

24 Claims, 8 Drawing Sheets

CONTINUOUS SHEET PLEATING DEVICE FOR MAKING OVERLAPPING PLEATS AND ARRANGEMENTS FOR MAKING AREAS WITH NO PLEATS AND METHOD OF MAKING PLEATS

BACKGROUND OF THE INVENTION

A. Field of Invention

This invention concerns a process for the continuous folding of a thin sheet with asymmetric pleats permitting the attainment of high outputs.

B. Description of the Prior Art

Fabric pleating machines are known which have a comb driven in an alternating movement to shape the pleat; this comb slips the end of the pleat between two rollers which press it. Then the pleats can be affixed to one another on all or part of their length by various means such as the attachment of an adhesive tape. These machines can also be used for pleating papers or thin complex sheets with or without a paper base. In France, pursuant to Patent No. FR-2595666-B1, a new technique of wrapping convex bodies has been developed, using thin, pleated compound sheets; the pleats used are asymmetric pleats affixed near their ends along a narrow tape running substantially perpendicular to the folding direction. The problem is that, although these machines have a very great flexibility permitting the production of a small number of sheets, when larger production is involved the rate of production is limited by the movements of the comb. That is because when the rate of production is accelerated, the accelerations and decelerations to which the comb is subjected increase and there is a risk of injuring and even of tearing the sheet being pleated. Hence, there is a need to find a machine operating at a high rate of output which will not treat the sheets aggressively. One of the means for reducing the aggressivity of the pleating device against the sheet is to diminish its relative velocity. This is the reason why the invention to be described makes use of a continuous pleating device.

OBJECTIVES AND SUMMARY OF THE INVENTION

An objective of the present invention is to provide an apparatus for the high speed production of parallel, asymmetric pleats.

A further objective is to provide a pleating device capable of forming a ribbon consisting of a preselected pleat separated by zones of a single width.

Yet a further objective is to provide a device with fixing means for fixing the pleats.

Other objectives and advantages shall become apparent from the following description. A pleating device constructed in accordance with this invention consists of tooth wheels with teeth and gaps substantially arranged to correspond to the pleats to be formed. After a continuous sheet is partially trained around the wheel conforming means are used to force the sheet to conform to the wheel thereby making folds. The folds are gathered from the wheel and folded to form pleats. Fixing means are then used to fix the pleats.

In one embodiment, one or more pleats are opened thereafter to form a zone having a single thickness. The zone may be used to cut a pleated ribbon into sections having a predetermined number of pleats. In another embodiment, this zone is formed simultaneously with the pleats.

DETAILED DESCRIPTION OF THE INVENTION

Figures 1, 2, 3:
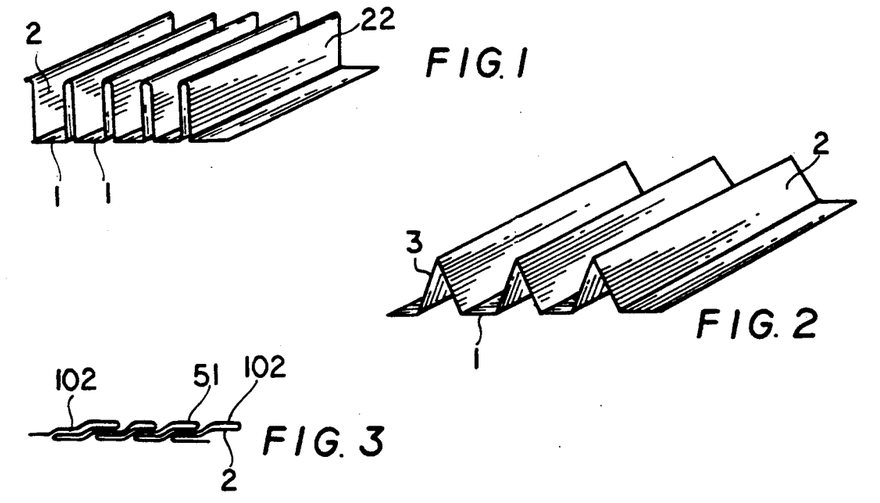
FIG. 1 represents a sheet formed of pleats which when folded over one on the other form asymmetric pleats.
FIG. 2 represents the foregoing pleated sheet before the pleats are gathered.
FIG. 3 represents the pleated sheet with the pleats flattened and asymmetric.

Each pleat formed with the device described herein is composed of two successive strips of different widths A and B, with B>A. The pleat can be removed down into a strip 1 of the width B-A (FIG. 1) followed by two strips 2 of width A. If the two strips 2 of width A are folded substantially perpendicular to the strips 1 of width B-A, strips 1 are substantially placed side by side, separated by a vertical fold 3 of a height substantially equal to A. If strips 1 (FIG. 2) are spaced apart, the vertical fold 3 also separates to form an inverted V-shaped profile. The principle of the machine consists, therefore, in positioning the strips 1 of width B-A on the sheet to be pleated in the configuration shown in FIG. 2, then bringing these strips 1 together to place them side by side as in FIG. 1. Finally, the fold 3 on pleat of height A (FIG. 3) that separates strips 1 is folded to obtain a finished pleat (FIG. 3). The pleats are then fixed or secured together and eventually areas without pleats are also created to permit the easy separation of successive lengths of pleated sheets.

Figure 4:
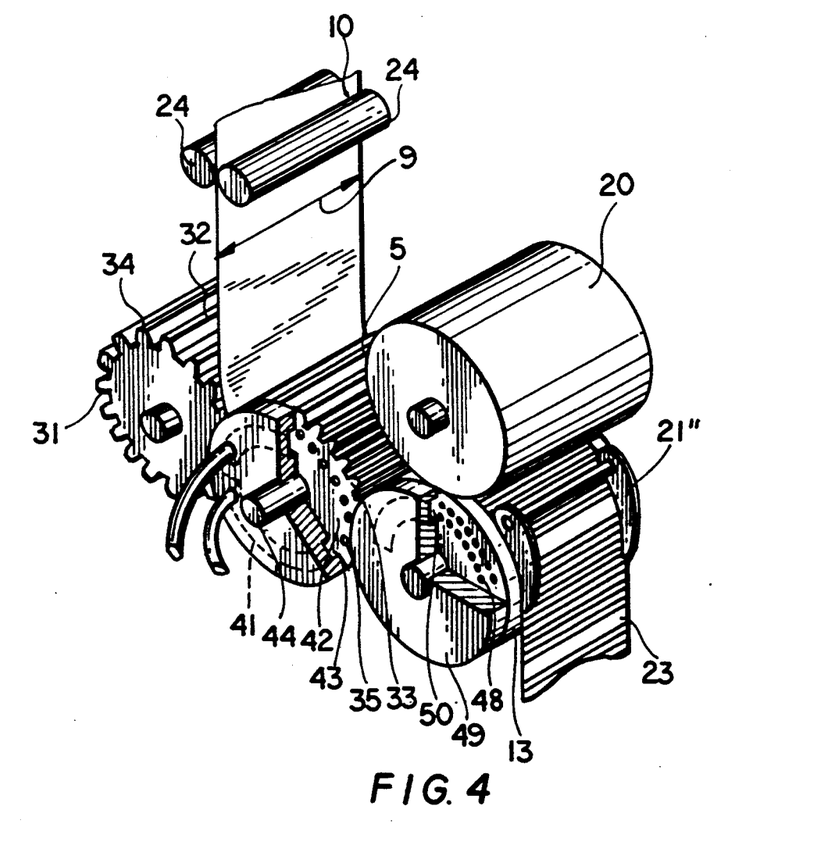
FIG. 4 represents the main components of the pleating device for one embodiment of the invention.
Figure 5:
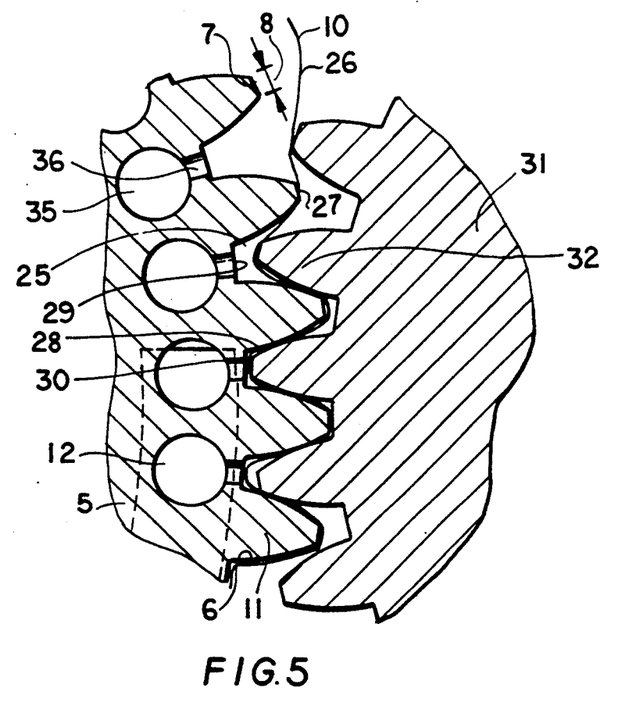
FIG. 5 represents the detail of the device for preforming the pleats on a toothed wheel.
Figure 6:
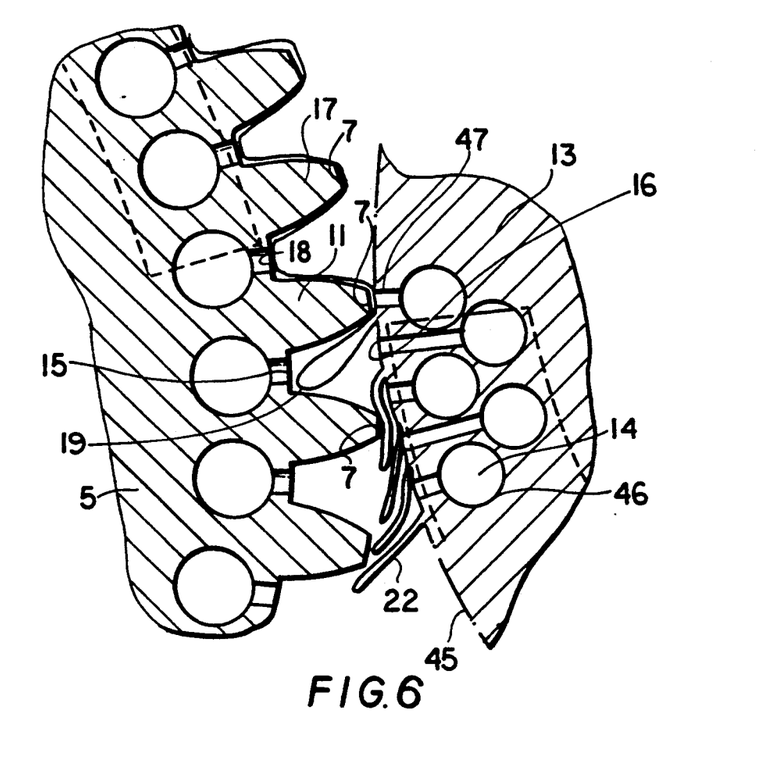
FIG. 6 represents a detail of the transfer and gathering of the pleats from the toothed wheel to the pleat gathering wheel.
Figure 7:
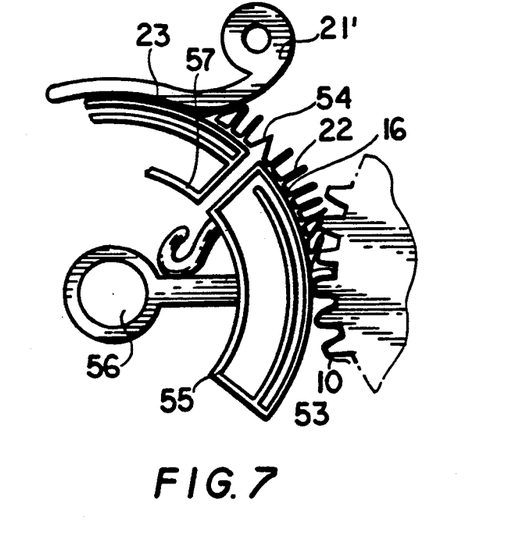
FIG. 7 represents the detail of the transfer from a pleat gathering wheel, represented in FIG. 8, designed to permit the unfolding of a pleat at regular intervals.

The alignment of the strips 1 of width B-A is accomplished by making a sheet 10 assume the profile 6 of a toothed wheel 5 (FIG. 5). The apex 7 of each tooth has a width 8 substantially equal to or less than B-A. The teeth of wheel 5 are arranged so that the section of sheet 10 disposed between two apexes 7 is substantially equal to 2A. Toothed wheel 5 has a width substantially greater than the width 9 of the sheet 10 to be pleated (FIG. 4). The sheet 10 is held in place on the teeth by a suction means 12 at the base of each tooth to hold the sheet 10 tight against the latter (FIG. 5). After folds 3 are formed on the sheet, the sheet 10 is transferred to a substantially cylindrical pleat gathering wheel 13 (FIG. 4) which is equipped on its entire surface with a suction means 14 (FIG. 6). This pleat gathering wheel 13 brushes against the apex 7 of the teeth 11. At the location where the folded sheet brushes against the pleat gathering wheel 13, the vacuum applied at the root 15 of the teeth is interrupted. The portion 16 of the sheet 10 that covers the apex 7 of the tooth 11 has a width equal to or less than B-A. This portion contacts pleat gathering wheel 13. Since pleat gathering wheel 13 rotates slower than the toothed wheel 5, the apex 7 of the next tooth 17 comes closer to the portion 16 on wheel 13. If the vacuum is broken in the space 18 between the two teeth 11 and 17, when it is estimated that the next portion 16 of width B-A is in its place, the strip covering the following tooth is transferred to the pleat gathering wheel 13 by aspiration. Thus, two strips 16 of a width substantially equal to B-A are obtained, disposed side by side and connected by a loop 19 of width 2A. When loop 19 is flattened, it forms the pleat 22 of the height A of a shape similar to the ones described in FIG. 1 (FIG. 7). Since the strips 16 are firmly held by the suction means 14, it is possible to flatten the pleats 22 by the use of sliding shoes 21 (FIG. 7) and/or rollers 20 (FIG. 4). The pleats 22 are then affixed to the sections 16 and the pleated sheet 23 is detached from the pleat gathering wheel 13. The fixing operation may be performed by any well known means, such as, fluting by the placement of adhesive strips, application of glue, etc.

During the formation of pleats 22, it is important that the sheet 1 conform to the shape of the toothed wheel 5. This is accomplished as follows. Two rollers 24 are positioned upstream of wheel 5 to feed a sheet 10 in form of a continuous ribbon, at substantially constant speed so that it will not be stretched. The sheet 10 (FIG. 5) is laid on the apex 7 of the teeth of the toothed wheel 5 (whose speed is synchronized with that of the rollers 24) so that the sheet 10 partially closes off the space 25 between two successive teeth 11. When the suction device 12 situated between two successive teeth 11 starts up, the sheet 10 is drawn to the bottom of the throat 29 between the two teeth 11, and thereby draws on the upstream portion 26 of the sheet 10 causing it to slide over the apex of the teeth on which it is placed. The downstream portion 28 of the sheet 10 is secured by the suction device 12 situated at the bottom of the preceding throat 30 as shown in FIG. 5. The shape of the throat 29 can be variable and maybe determined experimentally. Throat 29 is preferably polished and has no sharp corners so as not to injure the sheet. To facilitate the laying of the pleats on the wheel 13 it will be important to crease the folds 22 at the base and at the apex of the inverted V FIG. 2, particularly when the sheet 10 has a paper base. To obtain this result the phase in which the sheet is on the toothed wheel 5 will be used for marking the folds combining the shape of the teeth and the shape of the rollers which will thrust downward.

It is possible that the system described may not run fast enough for the rate of production that is desired. Then, the means for forcing the sheet into the throat can further include a second toothed wheel 31 (FIG. 4) driven by the first toothed wheel 5. The sheet 10 (FIG. 5) passes between the two toothed wheels 5 and 31. This wheel 31 has teeth 32 which enter between the teeth 11 of the first toothed wheel 5 so as to push the sheet 10 mechanically to the bottom of the throat 29, where the suction device 12 takes over. The second toothed wheel 31 can be designed so that there is no contact with the teeth 11 of the first toothed wheel 5. In this case, the wheel 31 is driven by the wheel 5 through an independent mechanical coupling such as additional toothed wheels formed by straight gears of circular development.

In the configuration of FIG. 5, the teeth 11 and 32 intermesh and the sheet 10 is therefore pinched between the two teeth 11 and 32 in contact. The pinching effort depends on the braking torque exerted on the second gear 31. This braking torque must be low if there are a plurality of consecutive teeth 11 and 31 in mesh because, the sheet 10 must be able more or less to slip between the teeth 11 and 32. One Way of preventing the sheet from tearing when the slippage is insuring that contact between the teeth 11 and 32 occur only at the lateral ends 33 and 34, in an area where there is no sheet 10 between the teeth (FIG. 4). Thus, teeth 11 and 32 may be profiled so that they contact at the axial ends of wheels 4, 31, but not in between.

When the tooth 32 of the second toothed wheel 31 is in line with the axis of the corresponding throat 30 of the first toothed wheel 5, the suction device 12 takes over to hold the sheet in place. The film continues to be held in place by vacuum until the apex 7 (FIG. 6) of the tooth 11 following the throat 15 passes to the vicinity of the pleat gathering wheel 13. At this moment the vacuum is broken and the sheet is transferred as described above. The toothed wheel 31 can also be used for other functions, such as for creasing the sheet to facilitate the flattening down of the pleats.

The vacuum for the toothed wheel 5 FIG. 5 is provided through a cylindrical bore 35 situated under the throat 25 between the teeth 11, with longitudinal axis at bore 35 and throat 25 being parallel. The cylindrical bore 35 communicates with the bottom of the throat 29 via ducts 36 regularly distributed along the length of the throat.

Figure 9:
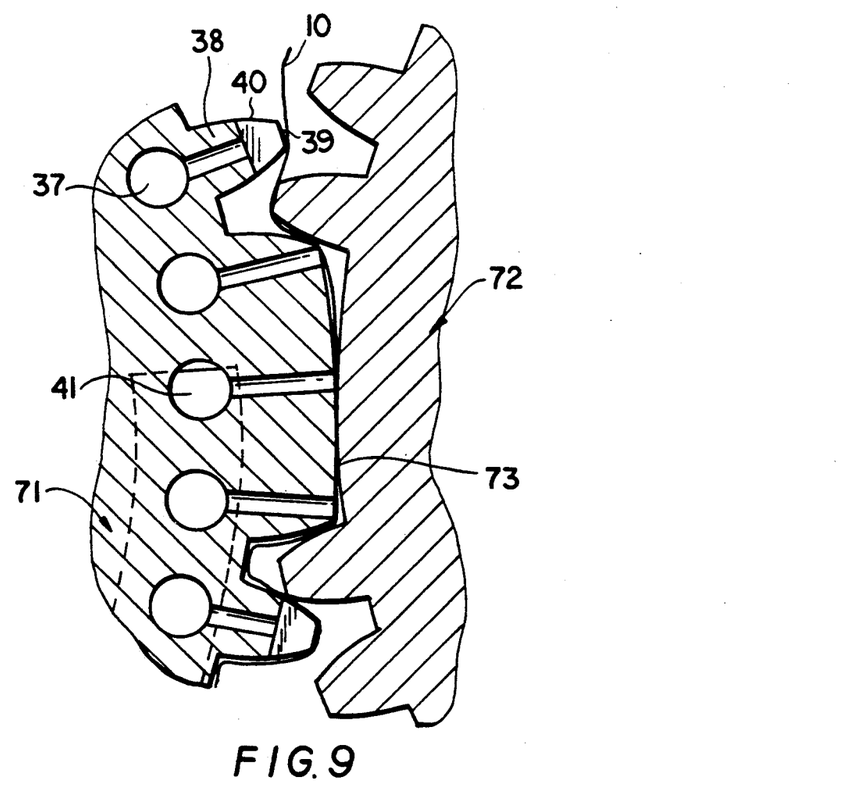
FIG. 9 represents the detail of the toothed wheel permitting an unpleated section to be created at regular intervals.

In an alterative embodiment, the bores 37 (FIG. 9) are situated under the teeth 38, and communicate with the apex 39 of the teeth through ducts regularly distributed along the length of apexes 39. The bores can open on the lateral wall 40.

Bores 35 communicate with a fixed vacuum chamber 41 (FIG. 4). The chamber 41 runs flat on the lateral wall 42 of the toothed wheel 5 and has one or more openings 43 whose shape makes it possible to apply the vacuum only to a portion of the bores 35. This chamber 41 can pivot slightly about an axis parallel to the axis of rotation 44 of the toothed wheel 5 for a precise adjustment of the position at which the vacuum is to be applied and at which it is to be discontinued, making allowance for hysteresis. It may be necessary in certain cases to apply a slight reverse air pressure to facilitate the separation of the sheet from the walls of the teeth 11 of the toothed wheel 5 against which it is flattened. This may be accomplished, for example, by cutting grooves on the face 7 of the teeth 11 and connecting the grooves to an air source to inject air between the tooth and the sheet in the instant when the vacuum is broken in order to accelerate separation between the sheet and wheel 5 and prevent sticking.

The pleat gathering wheel 13 FIG. 4 is a cylinder having on its circumference 45 (FIG. 6) a suction means 14 making it possible to hold in place, side by side, the strips 16. The speed of strips 16 is synchronized such that, when a point on the surface of the pleat gathering wheel 13 travels a distance equal to B-A, a point located at the apex 7 of a tooth 11 travels the distance corresponding to the pitch of the teeth. When the tooth 11 has deposited its strip of sheet 16 on the pleat gathering wheel 13, since its tangential speed is greater than that of the pleat gathering wheel 13, it pushes the pleat 19, which it has just formed. At this moment there is a risk that the strip 16 is pulled off from the pleat gathering wheel 13. To limit this problem, a toothed wheel 5 has a small number of teeth 11 so that the tooth will move away rapidly from the surface 45 of the pleat gathering wheel 13. Wheel 13 has the minimum required diameter to flatten down and then fix the pleats.

The vacuum means 14 (FIG. 6) of pleat gathering wheel 13 can be made in various ways. It is important that the suction rate be great in the vicinity of the transfer of the strips 16. In the entire area covered by strips 16 there is practically no air flow. It is therefore necessary to insure that the penetration of air into the vacuum circuit 14 takes place preferentially through the area of transfer of the strips 16. This assumes that the area where there is no sheet to block the holes 47, is isolated from the vacuum circuit and is at atmospheric pressure. Suction must begin at the point where the pleated sheet is separated from the toothed wheel 5. One way of creating this vacuum zone is to provide (as in the case of toothed wheel 5,) cylindrical bores 46 parallel to the generatrices of the cylindrical surface of the pleat gathering wheel 13, distributed regularly below the surface 45 of the latter, with preferably a pitch equal to B-A or multiple thereof. The bores 46 can be disposed at one or more levels, and communicating with the surface of the wheel through suction holes 47. The bores 46 open on the lateral surface 48 (FIG. 4) of the pleat gathering wheel 13. A fixed vacuum chamber 49 is secured to lateral surface 48 having one or more grooves 50 permitting the creation of the vacuum only in the required vacuum zone.

The pleat gathering wheel 13 includes a device 20 for flattening down the pleats 22 and another device 21 for affixing them to one another along the margins of pleated sheet 23. It is important that the pleats be flattened down at the time when they are fixed. The pleat flattening device can consist of a cylinder 20 rotating in synchronism with the pleat gathering wheel 13. Cylinder 20 presses the pleats 22 against the pleat gathering wheel 13 to achieve perfectly stabilized pleats. The flattening device consist of belts thrusting against the pleat gathering wheel 13 at substantially the same tangential speed. Alternatively, the flattening device may consist of shoes 21' held at one of their extremities and sliding on the pleated sheet 23, flattening the pleats 22 (FIG. 7). The fixation of the pleats to one another can be performed by welding along a lateral strip if at least one of the faces of the sheet contains a heat-activated glue or a heat welding plastic coating.

If the sheet is composed of kraft paper coated on one face with a polyethylene sheet, a temporary fixation of the pleats is performed. For this purpose the paper is arranged so that its coated face is in contact with the pleat gathering wheel 13. The pleats are pressed against the pleat gathering wheel 13 by one or more narrow rollers arranged in series, or a belt, or a hot shoe, so that the two adjacent strips 51 (FIG. 3) of width A are welded against one another. The temperature of the welding device 21" (FIG. 4) is regulated such that the portion of the pleated sheet 23 that is directly in contact with the pleat gathering wheel 13 does not reach the melting temperature of the heat-welding coating due to the heat losses caused by this contact. The choice of the welding method described depends essentially on the tangential velocity: the greater it is, the more it is necessary to try to prolong the time of contact to permit the diffusion of the heat and to prefer the use of belts or sliding shoes.

In many applications it is necessary to be able to cut off lengths of the pleated ribbon. If A is less than B-A there are separation areas in which there is only one thickness of sheet and it is possible to use to cut the sheet at these separation areas for cutting lengths. But if A is greater than B-A, there are no longer any zones where there is only one thickness of sheet, and if a cut is made through several thicknesses there will be waste which is not easily eliminated. It is therefore necessary to create an area without pleats having a single thickness.

In an alternate embodiment of the invention shown in FIG. 7, a pleat 54 or several successive pleats on the pleat gathering wheel 53 are opened before they are fixed, each time that a desired length of pleated sheet 23 has been reached. We are going to describe below the case in which a single pleat 53 is opened.

The desired length of pleated sheet 23 having a preselected number of pleats 22 includes a number of adjacent strips 16 of A lying side by side on the pleat gathering wheel 53. This preselected number defines sectors 55 on the pleat gathering wheel 53 movably disposed about a common axis of rotation 56. At the position of the transfer of the sheet 10 to the pleat gathering wheel 53, the sectors 55 and 57 touch one another and form a continuous surface. Thereafter, the downstream sector 57 accelerates progressively and moves away from the sector 55 which follows it. At this time, the pleat that is positioned at the line between the two sectors is opened up. The fixation of the pleats by a roller or belt device then takes place as described above, followed by the removal of the pleated sheet. Thereafter, the first sector 55 (FIG. 8) slows down to be progressively overtaken by the sector 58 until they touch to receive the pleated film again receiving pleated sheet.

This operation is performed with the assistance of a drive wheel 59 (FIG. 8) of the pleat gathering wheel 53, rotating at constant speed, whose axis of rotation 60 is parallel to the off-center wheel 33. Each sector 55 is controlled by this drive wheel 59 through a substantially radial cam 61. When the member 62 of the sector 55 moves away from the axis of rotation 60 of the drive wheel 59, the sectors 55 move away, and vice-a-versa. The eccentricity of wheels 53 and 59 is computed in the following manner.

Figure 8:
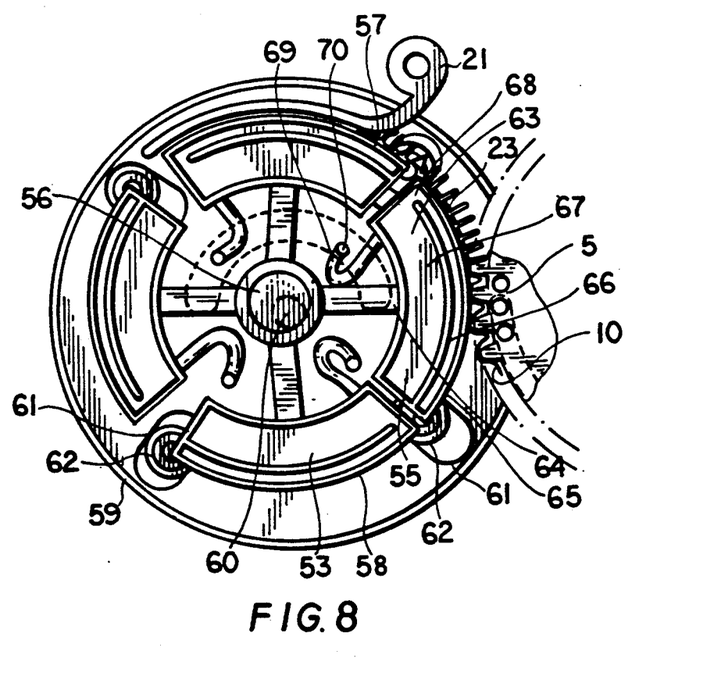
FIG. 8 represents the pleat gathering wheel designed to permit the unfolding of a pleat at regular intervals, with its drive system.

Let us assume that the length of the wrapping corresponds to N pleats. Therefore the length of sector 55 is then N*(B-A). If it is desired to open a pleat 54 (FIG. 7) the two sectors 55 and 57 (FIG. 8) which follow must be separated by a distance of the order of 2A. If a pleat gathering wheel 53 having a number of sectors S is used, the point on the drive wheel 59 where the separation is maximum travels during each revolution a distance $S*((N*(B-A))+2A)$. Therefore, $S*((N*(B-A))+2A)\pi$ is the diameter of the circle tangent to the pleat gathering wheel 53 which itself is internally tangent, centered on the drive wheel 59. The point at which the separation is minimum travels the distance $S*N*(B-A)$. Therefore $S*N*(B-A)/\pi$ represents the diameter of the circle tangent internally to the pleat gathering wheel 53 centered on the drive wheel 59. The two points of contact corresponding to the maximum opening on the one hand and to the minimum opening on the other hand are diametrically opposite, and the diameter D of the pleat gathering wheel 53 is equal to: $D=(S*N*(B-A)/\pi+(S*A/\pi)$. The distance E between the centers of the shafts 56 and 60 of the pleat gathering wheel 53 and of the drive wheel 59 is:

$$E=(D-((S*N*(B-A)\pi)))/2=(S*A)2\pi.$$

The drive wheel 59 has S cams 61, substantially radially and regularly distributed, along each of which moves a contact device 62 fastened on a sector 55 of the pleat gathering wheel 53. The zone of transfer of the sheet 10 from the toothed wheel 5 to the pleat gathering wheel 53 is disposed at the position where two contiguous sectors 55 and 57 join together. While a sector 55 is filling with joined pleats there is, by design, a speed variation of the wheel sector, which slows in a first period and accelerates in a second period if one assumes that the drive wheel 59 runs at constant speed. This is due to the fact that the cam 61 is radial. It is possible to modify the profile of cam 61 slightly to obtain a steady speed throughout the filling phase. This profile is obtained by drawing a diagram and plotting thereon the relative speeds of the two wheels 53 and 59 in order to deduce therefrom the shape of the cam 61.

If S=4, the computation shows that the speed variation induces a variation of the width of the strips 16 of plus or minus 12%. Since A+B remains constant by design, each of the values A and B will vary simultaneously but in opposite directions by approximately 6%; if, for example, B-A averages 5 mm, it actually varies between 4.4 mm and 5.6 mm. There are two additional factors involved in the selection of S. The first factor is that, if S is high, the diameter of the wheel increases. Second, at high output rates the teeth 11 of toothed wheel 5 making contact with the pleats 22 of the sheet which have already been transferred to the wheel, may tend to push the pleats forward. Moreover, the design of this wheel then threatens to be more difficult.

Each sector 55 (FIG. 8) of the pleat gathering wheel 53 has a cavity 63 in the shape of a portion of a cylinder, and it is articulated on the common shaft 56 of the pleat gathering wheel 53 by one or more rigid arms 64 freely revolving about this shaft 56. This cavity 63 has on the outer portion 65 of its wall, perforations designed to hold the sheet 10 after the transfer by suction. To limit vacuum losses, a wall 66 concentric with the exterior wall 65 forms a smaller space which communicates with the principal cavity 67 only in the zone 68 corresponding to the beginning of the transfer of sheet 10 onto the sector 55. As the sector 55 loads up, the vacuum orifices are blocked by the pleated sheet 23 deposited on it, the main area of suction moves and remains in the transfer zone just where it is needed for maximum suction. The principal cavity 67 of each sector is connected to a drive wheel 59 by a flexible hose 69; this flexible hose 69 communicates with an orifice 70 situated on the outer side wall of the drive wheel 59. A vacuum chamber similar to chamber 49 (FIG. 4) described in connection with the toothed wheel 5 and with the pleat gathering wheel 13 is applied against the outer lateral portion of the drive wheel 59 (FIG. 8). It has a cavity selectively providing or blocking communication of the flexible hoses with the vacuum. The vacuum is started substantially at the moment when the sector 55 in contact with the preceding sector 57 is in position to receive the transferred sheet. It is cut off at the moment when the sheet leaves the pleat gathering wheel 53 with its pleats 22 affixed to one another. The precise timing of these operations makes allowance for the hysteresis of the system. The capacity of the cavities 67 under vacuum must be as low as possible in order to reduce the response time.

When the pleat gathering wheel 53 includes sectors 55 which are movable with respect to one another, it is not possible to use pleat fixing devices acting simultaneously on two successive sectors 55 and 57 because their speeds differ. For example, belts cannot be used unless slippage is acceptable. If it is desired to press the pleats 22 with rollers pressing them against the sector 55 or 57 on which they are held, there will be problems with the sector changes because the speeds are different, and it is difficult under these conditions to synchronize the speeds. It will be preferable to use sliding shoes 21 which slide on the sheet and flatten down the pleats so that they can be temporarily fixed with electrically heated shoes. Once the pleats 22 are fixed and the pleated sheet 23 detached from the pleat gathering wheel 53, it is possible to treat the sheet in the conventional manner.

In another embodiment of the invention (FIG. 9), the two toothed wheels 71 and 72 are used such that, the number of successive teeth equals the number of pleats. The profile of the teeth is modified to introduce a gap corresponding in length to the arcuate angle of a minimum of three successive teeth only in the zone where the sheet is situated. Where the teeth of the two toothed wheels 71 and 72 are never in contact, the driving performed by the unmodified teeth situated near the lateral ends (similar to 33 and 34 in FIG. 4). For ease in comprehension, let us assume, for example, that we have a wrapper of 20 pleats (or N pleats) with (B-A)=A/2, and that we wish to have a space having only one thickness, whose length is on the order of 2A. At the lateral drive it will suffice to provide 44 teeth (or (N+2)*P teeth) on the toothed drive wheel 71 (FIG. 9) which would permit pleating, for example, two wrappers (or P wrappers) per revolution. Then the gap between 3 successive teeth is filled so that the sheet 10 will conform, for example, to the exterior profile 73 of the driving gear 71. Then a series of 19 teeth (or N−1) is resumed, and lastly the gap between 3 successive teeth is again filled up. The second toothed wheel 72 can have the same number of teeth as the driving gear 71, and it suffices to eliminate two teeth every twenty teeth to the right of those in which the gap has been filled, while still keeping them in the lateral zones to permit continuity of the drive.

Figure 10:
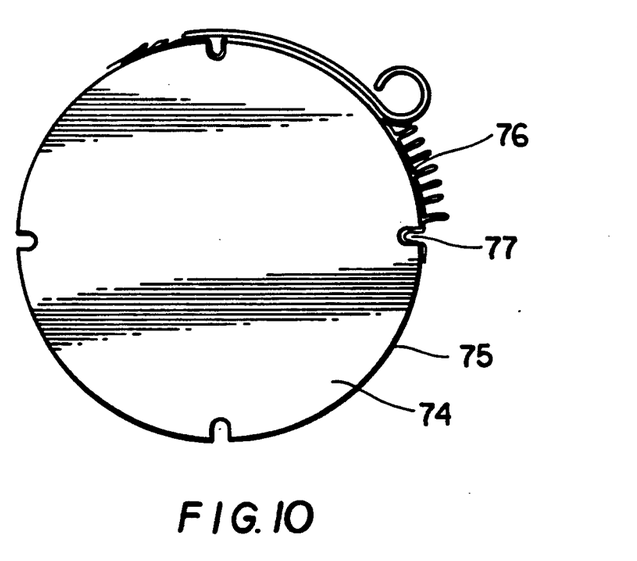
FIG. 10 represents the profile of a gathering wheel for the pleats formed by a toothed wheel of the type described in FIG. 9, particularly with the areas for the retraction of the unpleated areas.
Figure 11:
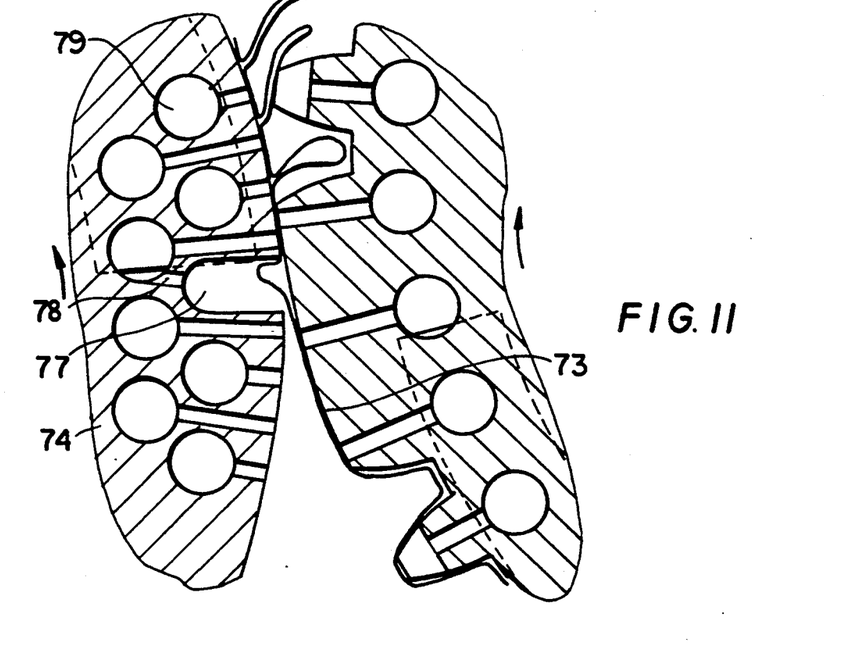
FIG. 11 represents the detail of the pleat gathering wheel described in FIG. 10 in the area where the sheet is transferred from the toothed wheel.

At the pleat gathering wheel 74 (FIG. 10), which is solid, as in the case where no separation zones are made, four sectors 75, for example, can be provided (or Q sectors), corresponding each to a wrapper of twenty pleats. On each sector twenty-one zones 76 are provided (or (N+1)) of the width B-A, then one gap 77 of width (B-A). This zone 77 (FIG. 11) includes a suction 78 at its base enabling the sheet 10 to be sucked into it, which corresponds to the three-tooth zone 73 in which the gap has been filled. Its depth must be sufficient to allow the sheet 10 to fit into it during the transfer without wrinkling. Lastly we continue with a new sector having twenty-one zones (or N+1 zones) of the width B-A. The pleat gathering wheel therefore comprises 88 zones 76 (or Q*(N+2) zones) of width B-A, which permits the establishment of its perimeter and its diameter. The pleat gathering wheel 74 has at the level of sectors 75 a suction means 79 having the same characteristics as the suction system 14 (FIG. 6) previously described.

The transfer of the sheet 10 between the toothed wheel 5, (FIG. 4), and the pleat gathering wheel 13 is performed on the fly because both wheels 5 and 13 rotate at different and constant speeds. It is possible to make the speed variable on one of the two or on both wheels so that the tangential speeds of the wheels will be equal at the position of the transfer of the sheet 10 from the one to the other. There are mechanical methods and electronic methods for solving this problem. But considering the hysteresis involved due to the rate of production, the methods should be employed only when the possibilities of transfer on the fly have been exhausted. Particularly in the case where the space is created by filling the gaps in at least three successive teeth, it will be possible to increase the speed of the pleat gathering wheel 13 at the position of the transfer of the unpleated zone so as to avoid having to create gaps 77.

In another embodiment, of the invention, the cutting of the lengths of pleated sheet can be performed directly on the toothed wheel 5. One such method consists in partially filling the gaps between three teeth as well as eliminating the tooth that separates them to bring it back to the original diameter of the wheel 5 and to partially eliminate the two corresponding teeth of the toothed wheel 31 as well as the gap between them, in order thus to bring this zone back to its original diameter. This zone can then be equipped with knives that will cut the sheet completely or partially by pressure or shearing. The cutting area is located in the pleated sheet straddling three pleats and can then be withdrawn into a gap 77 in the pleat gathering wheel.

The process which we have just described uses mainly a toothed wheel to whose shape the sheet to be pleated conforms. The apex of the tooth makes it possible to define the strips 16 of the width B-A. The sheet thus preshaped is transferred on the fly to a pleat gathering wheel which permits the strips of width B-A to be positioned side by side. This transfer on the fly is a source of uncertainty as regards the reliability of the transfer and therefore the rate of production of the machine.

In the embodiment of the invention that follows we are describing a mechanical system for the continuous gathering of pleats.

A description was given in FIG. 8 of a device permitting a pleat to be unfolded on the pleat gathering wheel so as to create an area in which there is only one thickness of sheet. The object of the present embodiment of the invention that we will describe hereinafter is to apply this same principle to the gathering of the pleats in the form of a device situated between the toothed wheel 107 (FIG. 12) for the preshaping of the pleats and the pleat gathering wheel 108.

Figure 12:
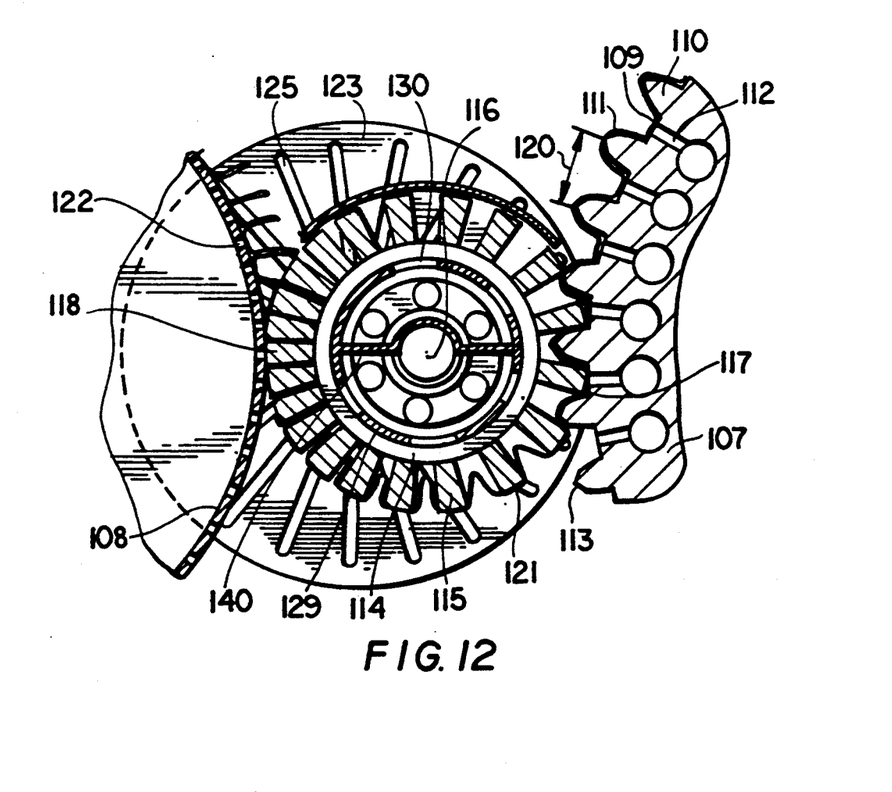
FIG. 12 represents, in a section taken perpendicular to its axis of rotation, the pleat pinching wheel in accordance with the invention, in position between the pleat preforming wheel and the pleat gathering wheel.

The simple case of a toothed wheel 107 in FIG. 12 continuously preshapes pleats without dealing with the problem of the unpleated zones. The zones 109 situated at the root of the teeth 110 permit the establishment of the strips 4 (FIG. 1) of the width B-A on the sheet 111 (FIG. 12). The teeth 110 define the zone corresponding to the inverted V 3 in FIG. 2. The sheet 111 (FIG. 12) is held in place by vacuum through orifices 112 at the base of the teeth as described above. The teeth 110 can form a crest 113 at their apex to enable a better marking or scoring of the fold that will separate the two strips 2 of width A at the apex of the inverted V 3 in FIG. 2. In the previous embodiment the zones of width B-A were formed by the apex of the teeth.

A pleat pressing wheel 114 in FIG. 12 is formed with sectors 115 rotatably movable about a common axis 116. Wheel 114 contacts pleat 117 on the toothed wheel 107. A wheel 114 rotates, the sectors 115 come closer together to become substantially joined in zone 118 opposite wheel 107 where the wheel 114 is substantially tangent to the pleat gathering wheel 108. Wheel 108 revolves at the same speed as that of the sectors 115 when these sectors pass into zone 118.

Figure 13:
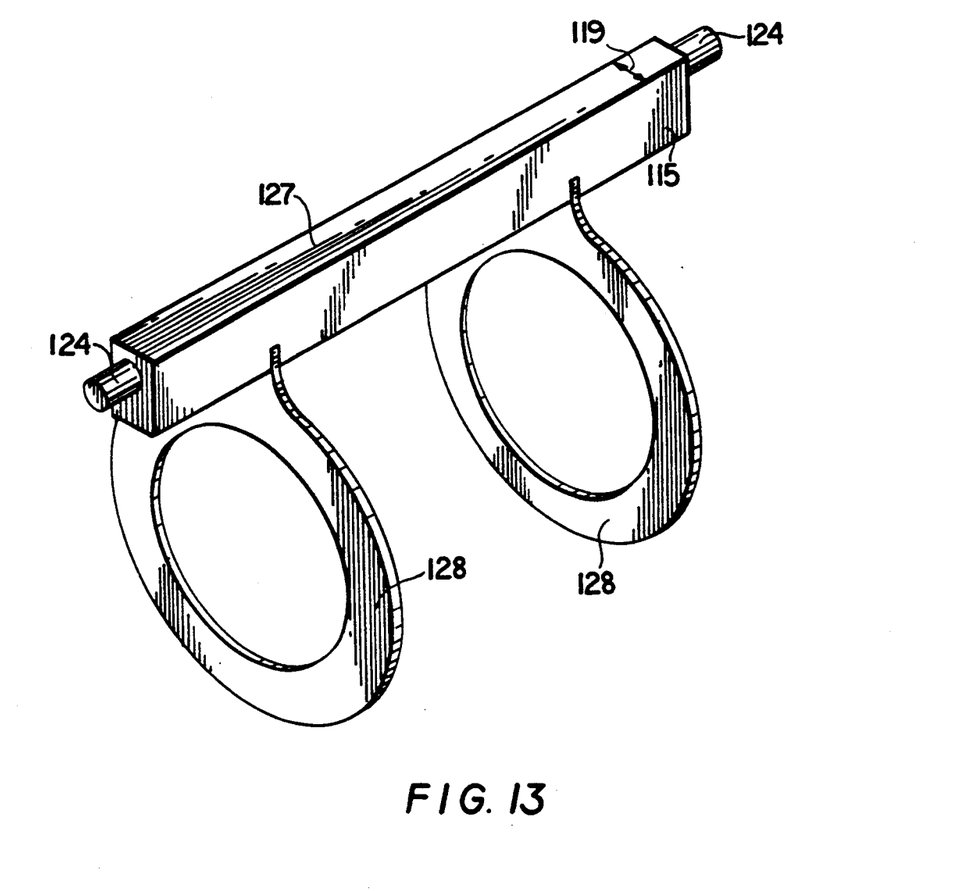
FIG. 13 represents, in perspective, a sector of the pleat tightening wheel.

Each of these sectors 115 (FIG. 13) has a width 119 at its apex substantially equal to B-A. When they are near toothed wheel 107, the separation between two successive sectors 115 equals the pitch 120 of the toothed wheel 107. The axis 116 is positioned so that the sectors 115 will, as they rotate, come into tangent contact with the bottom or root (109) between the two corresponding teeth 110. Between each of the sectors 115 a suction is applied that allows the pleat 117 covering tooth 110 to be pulled. Pleat 117 then becomes lodged between two successive sectors 115, while the strip 4 FIG. 2 of the width B-A which was covering the bottom 109 (FIG. 12) between two successive teeth 110 is moved to the top of the moving sector 115 of width B-A of the pleat pressing wheel 114. As the pleat pressing wheel 114 continues to turn, the consecutive sectors 115 come together to grip the pleat 117 situated between the consecutive sectors 115. A moment comes when these sectors 115 are substantially side by side. This is the moment for transferring the sheet whose inverted V-shaped pleat is being held, to the pleat gathering wheel 108 which rotates at the appropriate speed so that the tangential speeds of the sectors 115 and of the pleat gathering wheel 108 are substantially equal. The vacuum between the successive sectors 115 no longer acts on the pleat 117 because the sectors 115 are virtually joined together. On the other hand, the sheet zone 121 of width B-A (at 119 in FIG. 13) situated at the top of the sector is aspirated by the pleat gathering wheel 108 (FIG. 12). Wheel 108 has a cylindrical well which is perforated with holes 122 through which the air is aspirated as described above.

The design of the pleat pressing wheel 114 is accomplished as described above. When the sectors 115 of width B-A are farthest apart, they have the pitch P 120 of the toothed wheel 107. If there are N sectors 115, the perimeter of the driving wheel 123 at this level of separation 120 is equal to $N*P$, and the diameter is $N*P/\pi$. When the sectors are closed up the diameter of the drive wheel 123 at this level is $(B-A)*N/\pi$. The diameter of the pleat pressing wheel 114 containing the N sectors is $N*P+(B-A)*N)/2*\pi$. The distance between the center 115 of the pleat pressing wheel 114 and the center of the drive wheel 123 is (B-A)*N/2π)−(N*P+(B-A)*N)/4π).

Preferably, a drive wheel 123 is provided on each side of the pleat pressing wheel 114. These two wheels 123 are preferably synchronized and can be rotated by the pleat preshaping wheel 107.

The sectors 115 have at their extremities pivots 124 (FIG. 13) sliding in radial grooves 125 in the drive wheel 123. The vacuum can be brought through the drive wheel 123 (FIG. 14) for sector 115 by means of a tube 126 which passes through the fixed axial zone 141 common to the two shafts 116 and 140. In a preferred version of the invention the sectors 115 are composed of bars 127 of substantially trapezoidal cross section affixed to at least one disk 128 which is perpendicular to the bar and which is journaled on a cylindrical tube 129 (FIG. 14) about the axis coaxial with tube 126. Tube 126 carries the air aspirated from between the sectors 115 through orifices 130 and then exits through the tube 126. Alternatively, the air can be aspirated through the wheel 114 through the area which is not covered by the sheet.

Figure 14:
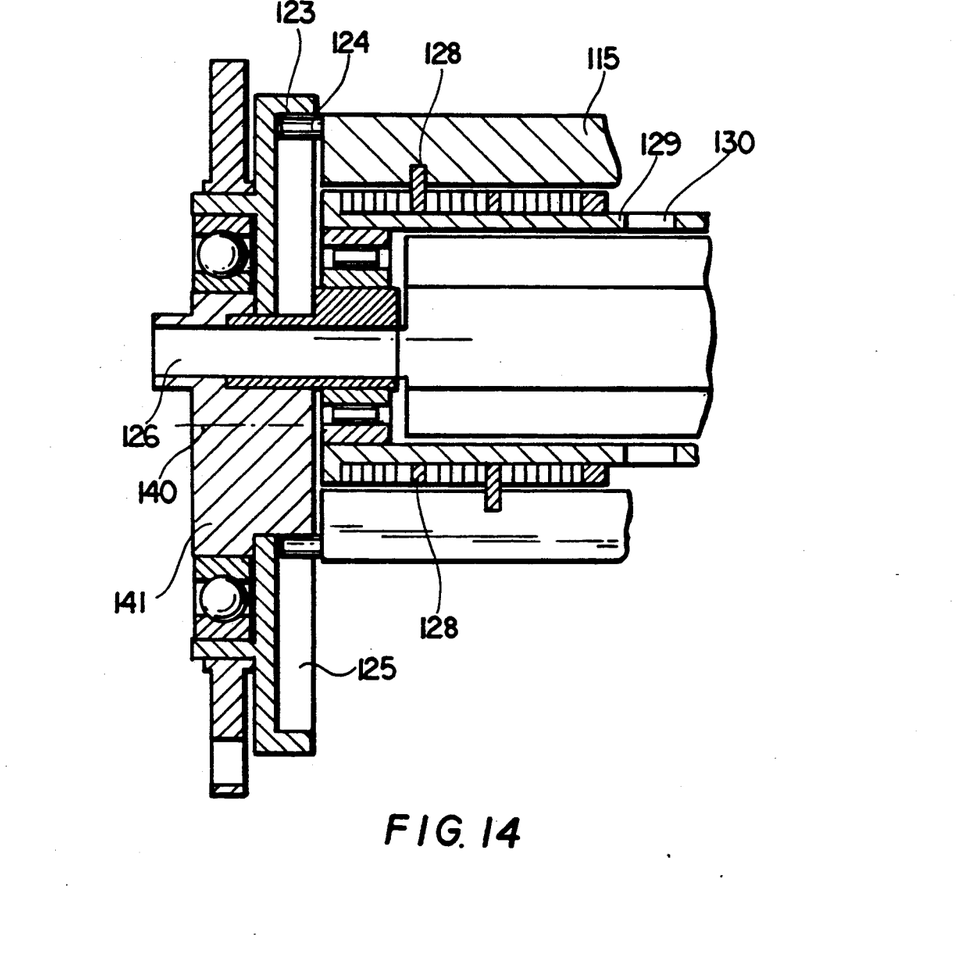
FIG. 14 represents a section of the wheel taken along a plane passing through the axes 116 and 140 of the pleat pinching and driving wheels.

In a preferred version of the invention, in order to limit the rubbing of the disks 128 on the tube 129, the latter is mounted on rolling bearings so that it can rotate freely about its shaft 116. In this manner it revolves substantially at the speed of the drive wheel 123 and the disks 128 in rotation undergo displacements with respect to this tube 129 of several centimeters to either side of a center position.

Figure 15:
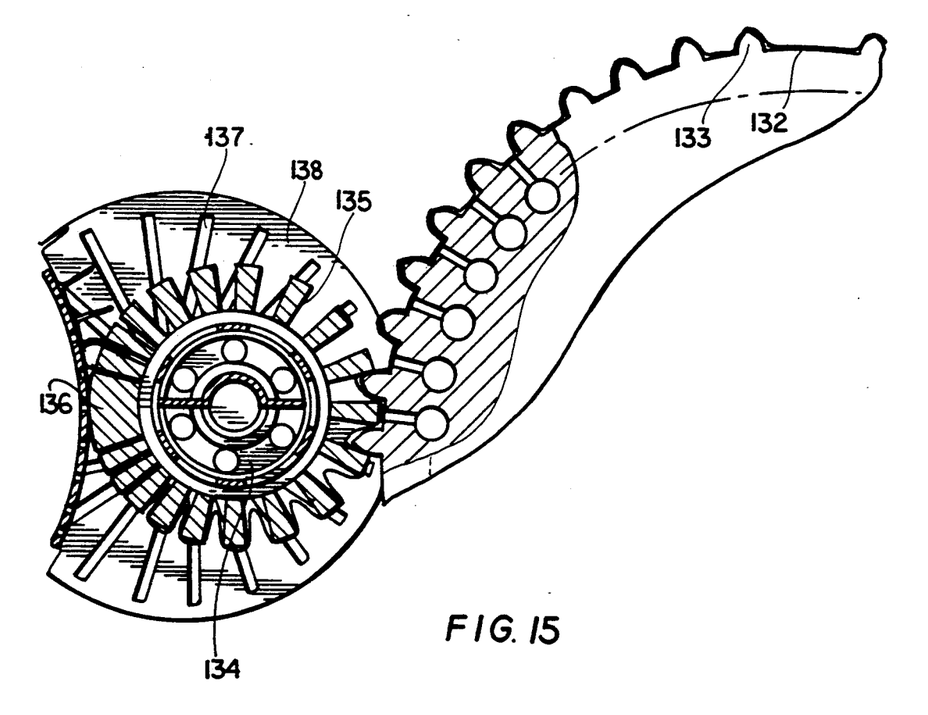
FIG. 15 represents an alternate embodiment of the pleat pinching wheel permitting unpleated areas to be obtained.

If it is desired to create an unpleated space every N pleats, it will suffice, as indicated previously in the patent, to omit, for example, one tooth every N pleats (FIG. 15) by making a toothed wheel 131 having a whole number teeth 133, N times separated by a toothless zone 132. This zone can extend over an angular arc equal to the arc of one or more teeth 133, or it can be of an arbitrary size. The pleat pressing wheel 134 will have, for example, N sectors 135 of a width substantially equal to B-A plus one sector 136 of a width substantially equal to P+(B-A) if it has been decided to omit one tooth 133. The preceding calculations are resumed allowing for the fact that one of the sectors 136 has a different width. The grooves 137 of the drive wheel 138 in which the pivots 124 (FIG. 13) will no longer be radial except for the widest sector 136 and possible the one diametrically opposite it. The orientation of the groves 137 and, if necessary their shape, is determined empirically. The method of synchronizing the drive wheels 138 and the shape of the pleat gathering wheel 139 remain the same. The pleat gathering wheel 139 remains identical to that described i.e., a cylindrical surface. It therefore permits the performance of all operations of folding down, pre-fixation of the pleats and if necessary it has belts to assure the guidance of the pleated sheet after leaving the wheel. Obviously it is possible to have several zones without teeth 132 on the toothed wheel, to which one or more sectors 136 correspond on the pleat pressing wheel.

Numerous modifications can be made to the invention without departing from its scope as defined in appended claims.

We claim:

1. A sheet pleating device comprising:
a first tooth wheel having a plurality of forming teeth disposed preferably on the tooth wheel and rotating at a first speed;
conforming means cooperating with said tooth wheel to continuously conform a sheet to said forming teeth to form folds spaced at a first distance; and
pleat gathering means for collecting folds and including a member moving at a speed different from said first speed to collect said folds and space them at a second distance different from said first distance to produce a continuous ribbon of pleats, wherein said pleat gathering means further includes flattening means for flattening said folds side by side in an overlapping relationship.

2. The device of claim 1 wherein forming teeth have apexes for holding said sheet, said apexes being separated by gaps with gap bottoms, said device further comprising one suction means for sucking air through said gap bottoms.

3. The pleating device according to claim 1 further comprising a second toothed wheel with push teeth synchronized with said first toothed wheel to push said sheet to said gap bottom.

4. The pleating device according to claim 3 wherein said push teeth are developed around a circle and wherein said teeth have enlarged ends for meshing said first and second wheels and wherein said teeth have their profile modified in a central zone occupied by said sheet, in which central zone said teeth do not contact.

5. The pleating device of claim 1 wherein said gathering means includes a gathering wheel and suction means for holding said ribbon of pleats on said gathering wheel.

6. The pleating device according to claim 5 wherein said gathering wheel has arcuate sectors movable angularly with respect to one another about a common shaft, said gathering means further comprising a drive wheel for controlling said sectors, said drive wheel having a drive shaft off-center and parallel with respect to said common shaft, and cams provided to unfold one or more pleats so as to create on the pleated sheet zones without pleats in order easily to separate lengths of pleated sheet.

7. The pleating device according to claim 6 wherein each sector has a vacuum cavity connected to said drive wheel by a flexible tubing arranged to provide a maximum rate of aspiration in the vicinity of the area where the pleats are transferred from the first tooth wheel.

8. The device of claim 1 wherein said first tooth wheel is constructed to form a preselected number of folds separated by a zone of preselected length with no folds.

9. The pleating device according to claim 1 wherein said pleat gathering means includes a folding device wherein said folding device is selected from the group consisting of belts and sliding shoes.

10. The sheet pleating device according to claim 1 wherein the pleats have a layer of thermo-weldable or thermo-activable material said device further including welding means and heating means for heating said welding means to apply heat to said sheet to weld said pleats.

11. Sheet pleating device according to claim 1 further comprising a pleat pressing wheel made up of pressing sectors movable about a shaft, which substantially touch the bottom of throats of a width substantially equal to the width of said first toothed wheel, with the same pitch as the latter and moving at the same tangential speed, in order to take the sheet from it by atmospheric depression whereby a pleat covering a tooth of said first toothed wheel is lodged between two consecutive pressing sectors which then, in the course of the rotation, come closer to one another to progressively said pleat in order to transfer the sheet to said pleat gathering means.

12. Sheet pleating device according to claim 11, wherein said pleat pressing wheel is driven by a driving wheel which is synchronized with said first toothed wheel and wherein said gathering means includes a pleat gathering wheel, having a gathering center offset from the center of rotation of said pleat pressing wheel.

13. Sheet pleating device according to claim 12, wherein said pleats consist of successive first and second strips of width A and B respectively and wherein said pressing wheel has N identical pressing sectors and a diameter given by $(N*P+((B-A)*N)(2*\pi)$ wherein P is the pitch of the sectors, and wherein the distance between the pressing center and the center of the drive wheel is substantially equal to $(B-A)*N/(2*\pi)-(N*P+(B-A)*N)4*\pi)))$.

14. Sheet pleating device according to claim 11 wherein each pressing sector includes a bar of substantially trapezoidal section connected to at least one disk perpendicular to said trapezoidal section rotating loosely on a tube having a tube axis.

15. Sheet pleating device according to claim 14, said tube rotates loosely about said tube axis.

16. Sheet pleating device according to claim 14, wherein air is aspirated from the space between the consecutive sectors to the interior of said tube through orifices, then is evacuated by an exit tube through an axial zone of support of said axes.

17. Sheet pleating device according to claim 14 wherein air is aspirated from the space between consecutive sectors and evacuated directly through said pressing wheel.

18. Sheet pleating device according to claim 1 wherein said pleats consist of successive first and second strips of width A and B respectively and wherein said first tooth wheel includes one zone having no teeth, of a width greater than B-A.

19. Sheet pleating device according to claim 1, wherein said drive wheel is driven directly by said second toothed wheel through a gearing.

20. A method of generating a continuous ribbon of pleats comprising the steps of:
training a continuous sheet around a toothed wheel;
forcing said sheet between the teeth of said tooth wheel to generate folds spaced at a first distance;
gathering said folds by reducing the spacing between said folds from said first distance; and
pressing said folds to form pleats.

21. The method of claim 20 further comprising fixing the pleats.

22. The method of claim 21 wherein said toothed wheel includes a wheel zone without teeth to form a ribbon having several pleats separated by a sheet zone with no pleats.

23. The method of claim 20 further comprising the step of opening one of the teeth to form a zone on said ribbon with no pleats.

24. A device for pleating a continuous flexible sheet of flexible material, said device comprising:
a tooth wheel having a plurality of teeth moving at a first speed;
conforming means cooperating with said tooth wheel to fold said sheets into a first set of sheet segments and a second set of sheet segments;
pleat gathering means positioned to receive said sheet segments from said tooth wheel, said gathering means including a member moving at a second speed slower than said first speed to gather said sheet segments with two segments of said first set being in contact with each other to form folds and being separated by sheet segments of said second set; and
flattening means for flattening said folds in an overlapping fashion to form a continuous ribbon of pleats.

* * * * *